(12) United States Patent
Liu

(10) Patent No.: US 8,016,352 B2
(45) Date of Patent: Sep. 13, 2011

(54) VEHICLE MULTIMEDIA SYSTEM FOR VEHICLE

(76) Inventor: Edward Liu, City of Industry, CA (US)

( * ) Notice: Subject to any disclaimer, the term of this patent is extended or adjusted under 35 U.S.C. 154(b) by 253 days.

(21) Appl. No.: 12/288,951

(22) Filed: Oct. 24, 2008

(65) Prior Publication Data

US 2009/0091163 A1 Apr. 9, 2009

Related U.S. Application Data

(63) Continuation-in-part of application No. 11/591,197, filed on Oct. 31, 2006, now Pat. No. 7,597,394.

(51) Int. Cl.
*A47C 7/72* (2006.01)

(52) U.S. Cl. ............... 297/217.3; 297/217.4; 297/217.5; 297/406; 297/407

(58) Field of Classification Search ............... 297/217.3, 297/406, 217.4, 217.5, 407; 439/23–26, 439/924.1
See application file for complete search history.

(56) References Cited

U.S. PATENT DOCUMENTS

| | | | | |
|---|---|---|---|---|
| 4,835,604 A * | 5/1989 | Kondo et al. | ................... | 725/76 |
| 6,022,078 A * | 2/2000 | Chang | ........................... | 297/391 |
| 6,058,288 A * | 5/2000 | Reed et al. | ................... | 455/3.06 |
| 6,158,795 A * | 12/2000 | Gray et al. | ................... | 296/37.8 |
| 6,250,967 B1 * | 6/2001 | Chu | ............................... | 439/668 |
| 6,752,444 B2 * | 6/2004 | Kitano et al. | ............... | 296/184.1 |
| 6,871,356 B2 * | 3/2005 | Chang | ............................. | 725/75 |
| 7,114,780 B1 * | 10/2006 | Lee et al. | ....................... | 297/406 |
| 7,496,438 B2 * | 2/2009 | Amano et al. | .................. | 701/48 |
| 7,591,508 B2 * | 9/2009 | Chang | ........................ | 297/217.3 |
| 7,597,394 B2 * | 10/2009 | Liu | ............................. | 297/217.3 |
| 7,735,928 B2 * | 6/2010 | Droche | ......................... | 297/404 |
| 2003/0093798 A1 * | 5/2003 | Rogerson | ........................ | 725/75 |
| 2004/0007906 A1 * | 1/2004 | Park et al. | ................... | 297/217.3 |
| 2005/0110313 A1 * | 5/2005 | Vitito et al. | ................ | 297/217.3 |
| 2005/0166238 A1 * | 7/2005 | Vitito | .............................. | 725/77 |
| 2011/0031789 A1 * | 2/2011 | Liu | ............................. | 297/217.3 |

* cited by examiner

*Primary Examiner* — Rodney B White
*Assistant Examiner* — Joseph Edell
(74) *Attorney, Agent, or Firm* — Raymond Y. Chan; David and Raymond Patent Firm

(57) ABSTRACT

A vehicle multimedia system includes a head pillow, a display screen supported at the rear side of the head pillow, a central control, which is adapted for being installed at a predetermined location of the vehicle, electrically linked to the display screen via a connection cable running through one of the supporting arms such that the connection cable is extended between the display screen and the central control in a hidden manner, wherein the central control selectively generates a signal and transmits the signal to the display screen through the connection cable, so as to display on the display screen. Thus, the central control provides both the synchronizing mode and the discrete mode such that more than one function is selectively operated by the central control through the different display screen to meet the needs of passengers.

20 Claims, 11 Drawing Sheets

VEHICLE MULTIMEDIA SYSTEM FOR VEHICLE

CROSS REFERENCE OF RELATED APPLICATION

This is a CIP application of a non-provisional application having an application Ser. No. 11/591,197 and a filing date of Oct. 31, 2006, now U.S. Pat. No. 7,597,394.

BACKGROUND OF THE PRESENT INVENTION

1. Field of Invention

The present invention relates to car seat head rest, and more particularly to a car seat head rest with built-in screen having a central control provides both the synchronizing mode and the discrete mode such that either one or more functions can be operated by the central control at different screen monitors to meet the entire passenger's need.

2. Description of Related Arts

Every car nowadays has a car seat head rest installed on its car seat. A conventional head rest for car seat comprises a head pillow and two parallel supporting rods downwardly extended from the head pillow to slidably engage with two retention slots of the car seat. Accordingly, as different car models have different sizes of car seat, a specific dimensioned head rest might be tailor-made for the specific car seat. In other words, the distance between the two supporting rods of the head rest must match with a distance between the two retention slots of the car seat. Therefore, the driver cannot selectively switch the head rest from one car to another car.

In addition, most cars are modified to build a LCD screen at the rear side of the head rest for entertainment. However, the LCD screen must be incorporated with the original manufactured head rest. Since the original manufactured head rest is mainly made for supporting the head of the driver, the LCD screen does not provide any rigid frame structure to support LCD screen. In other words, such head rest which has the LCD screen often has problem with the LCD screen damaging from vibration and external shocks as the vehicle experience obstacles along the road. This happens because the supporting frame which holds the LCD screen provides a lot of freedom for the LCD screen to move around inside the head rest and thus damaging the electronic components of the LCD screen.

The conventional display screen usually built-in the rear side of the head pillow and can mostly operate by the driver. The driver is not only focus on driving, but also needs to operate the central control to adjust the program showing on the display screen. For example, when the driver tries to change the function on the monitor, more than half of their attention is focus on adjusting the function. It is really dangerous and may cause a lot of car accident.

Furthermore, the conventional display screen can usually operate limited function, and all the people in the car are required to see the same video or the same music. For example, even though there are some cars having more than one display screens, the display screen can only operate one function at a time. The function of the car seat head with built-in screen is not suitable for everyone's need. Different people have different interests and desires when they stay in the car. For example, younger people may prefer to play computer games and watch DVDs while sitting within the car. On the other hand, a middle aged person may prefer to watch TV or surf the internet. The function of the conventional car seat head with a built-in screen only focuses on watching DVDs. Thus, the existing car seat head with built-in screen cannot satisfy the current needs of both younger and middle aged people.

SUMMARY OF THE PRESENT INVENTION

The main object of the present invention is to provide a vehicle multimedia system for a vehicle, which forms a multimedia center for the vehicle to provide a combination of different entertainment forms including text, audio, video, picture, and interactivity content forms for all passengers in the vehicle.

Another object of the present invention is to provide a vehicle multimedia system for a vehicle, wherein the vehicle multimedia system has a central control providing both the synchronizing mode and the discrete mode such that either one or more functions can be operated by the central control to meet the entire passenger's need.

Another object of the present invention is to provide a vehicle multimedia system for a vehicle wherein the display screen comprises a LCD monitor and a touch screen control interfacing with the LCD monitor to controllably operate the central control in such a manner that the display screen provides not only a display interface for displaying signal from the central control but also a control interface for operating the central control to selectively output the signal.

Another object of the present invention is to provide a vehicle multimedia system for a vehicle wherein the display screen is adapted for a passenger controllably operating the central control so as to keep a driver focusing on driving.

Another object of the present invention is to provide a vehicle multimedia system for a vehicle wherein the central control comprises a broadcasting circuit communicatively linked to the control processor for wirelessly receiving a radio broadcasting signal and television broadcasting signal.

Another object of the present invention is to provide a vehicle multimedia system for a vehicle wherein the central control comprises a wireless phone link communicatively linked to the control processor for wirelessly paring with a mobile phone, such that the display screen is adapted for wirelessly operate the mobile phone through a wireless phone link.

Another object of the present invention is to provide a vehicle multimedia system for a vehicle wherein the central control comprises a GPS navigation circuit communicatively linked to the control processor for obtaining a GPS signal such that when the user gets lost on the way to somewhere, he or she can gain the right direction from the navigation.

Another object of the present invention is to provide a vehicle multimedia system for a vehicle wherein the central control comprises a car camera input linked to the control processor for obtaining the data image from cameras or camcorders so as to not only transmit a picture or video profile to the display screen but also manage the image profile through the display screen.

Another object of the present invention is to provide a vehicle multimedia system for a vehicle wherein by using the remote control; the user can further control the display screen more easily and make us feel comfortable.

Another object of the present invention is to provide a vehicle multimedia system for a vehicle wherein a built-in screen that has a central control that can perform the following functions: DVD, CD, TV, FM/AM radio, Navigation thus the user is able to enhance the enjoyment while sitting within the car.

Another object of the present invention is to provide a vehicle multimedia system for a vehicle wherein a central control is adapted for being installed at a predetermined location of the vehicle such that the built-in screen can highly expand its original function.

Another object of the present invention is to provide a vehicle multimedia system for a vehicle wherein the connection cable is extended between the display screen and the central control in a hidden manner so as to improve the appearance of the car seat.

Another object of the present invention is to provide a vehicle multimedia system for a vehicle with touch screen capabilities, so that operating the built-in screen is much easier.

Another object of the present invention is to provide a vehicle multimedia system for a vehicle wherein the built-in screen and the central control can transmit the signal via blue ray and wifi such that it can eliminate unnecessarily rod and cable connection and reduces the chance of short circuit because of bad connection.

Another object of the present invention is to provide a vehicle multimedia system, wherein a car seat head rest with built-in screen which allows the head rest to be installed in any type of car seat.

Another object of the present invention is to provide a car seat head rest with built-in screen, wherein two parallel supporting arms are adjustable with a distance therebetween to match with two retention slots of the car seat, such that the car seat head rest is adapted to be self-adjusted to fittedly incorporating with any size or type of car seat.

Another object of the present invention is to provide a car seat head rest which the mounting mechanism is highly resistant to vibration and external impacts thus ensuring the head rest can be firmly mounted onto the car seat.

Another object of the present invention is to provide a car seat head rest with built-in screen to provide entertainment to passengers without alternating the original structure of the car seat.

Another object of the present invention is to provide a car seat head rest with built-in screen which is stably installed within the head rest to protect its electronic components from vibration and external impacts.

Accordingly, in order to accomplish the above objects, the present invention provides a vehicle multimedia system, comprising:

a head pillow having a rear side, a bottom side and an interior cavity, and two tubular supporting arms downwardly extended from the bottom of the head pillow for slidably engaging with two retention slots of the car seat so as to support the head pillow above the car seat;

a display screen supported at the rear side of the head pillow;

a central control, which is adapted for being installed at a predetermined location of the vehicle, electrically linked to the display screen via a connection cable running through one of the supporting arms such that the connection cable is extended between the display screen and the central control in a hidden manner, wherein the central control selectively generates a signal and transmits the signal to the display screen through the connection cable, so as to display on the display screen.

These and other objectives, features, and advantages of the present invention will become apparent from the following detailed description, the accompanying drawings, and the appended claims.

DETAILED DESCRIPTION OF THE PREFERRED EMBODIMENT

Figure 1:
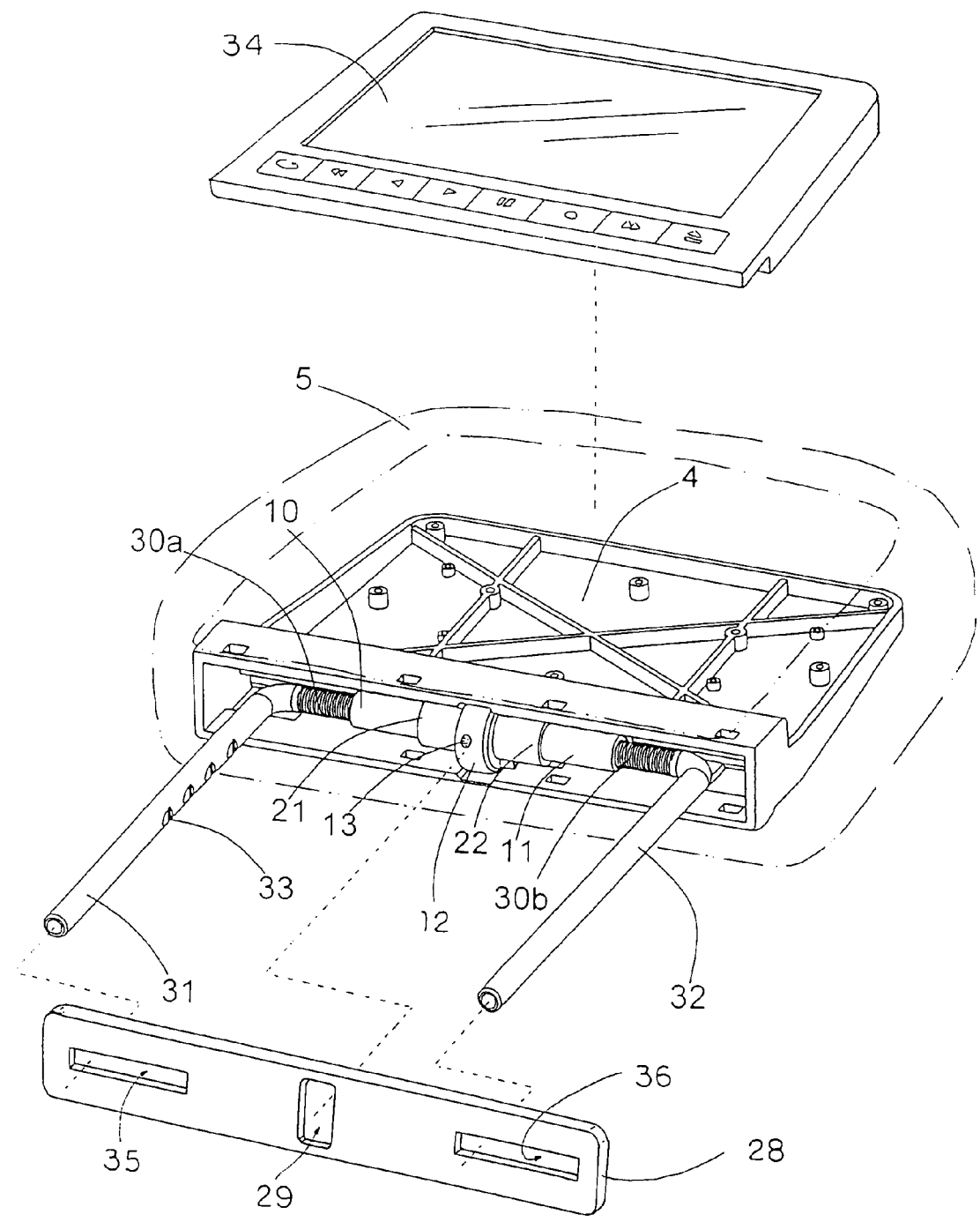
FIG. 1 is an exploded perspective view of the car seat head rest for mounting on a car seat with the display screen according to a preferred embodiment of the present invention.
Figure 3:
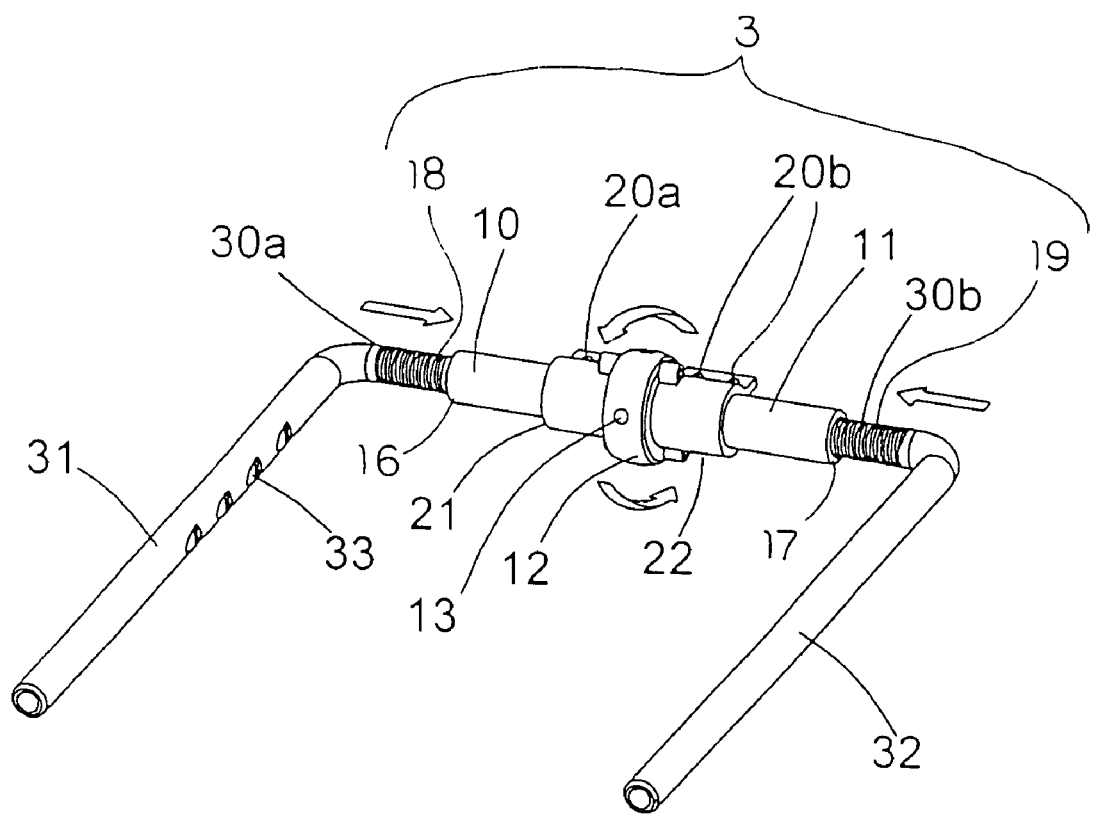
FIG. 3 is a perspective view of the adjustable mounting arrangement illustrating a rotation of the manual tuner that minimizes the engaging distance according to the preferred embodiment of the present invention.
Figure 4:
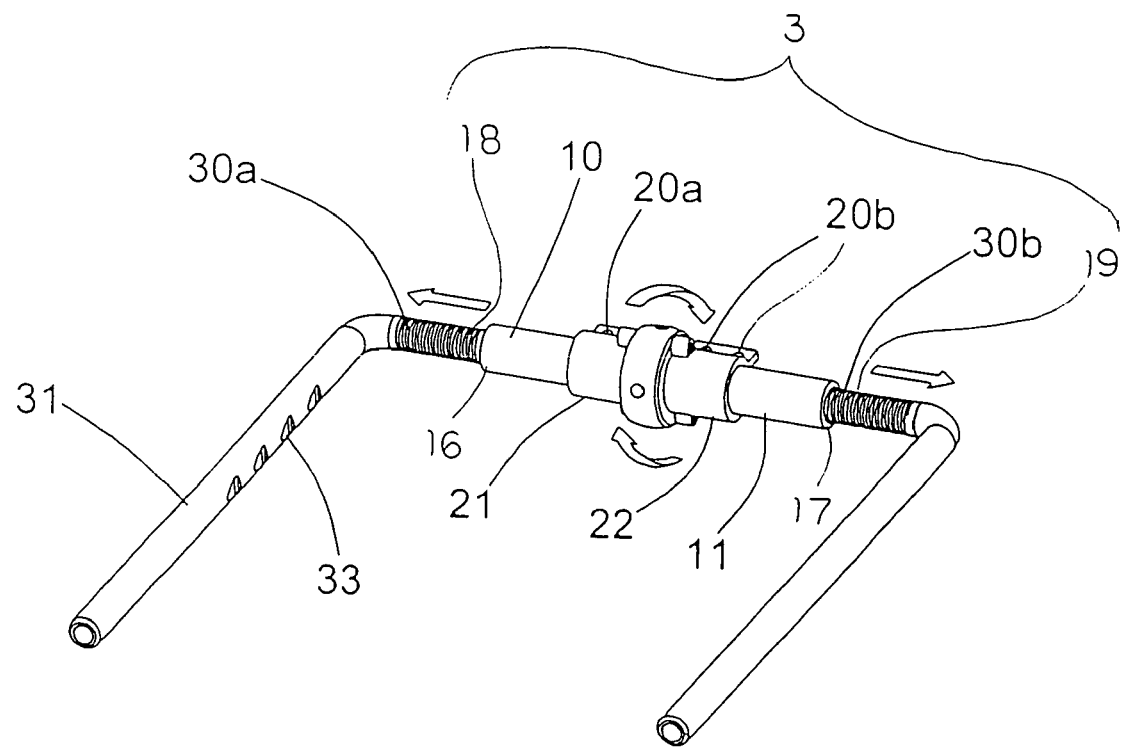
FIG. 4 is a perspective view of the adjustable mounting arrangement illustrating a rotation of the manual tuner that maximizes the engaging distance according to the preferred embodiment of the present invention.
Figure 5:
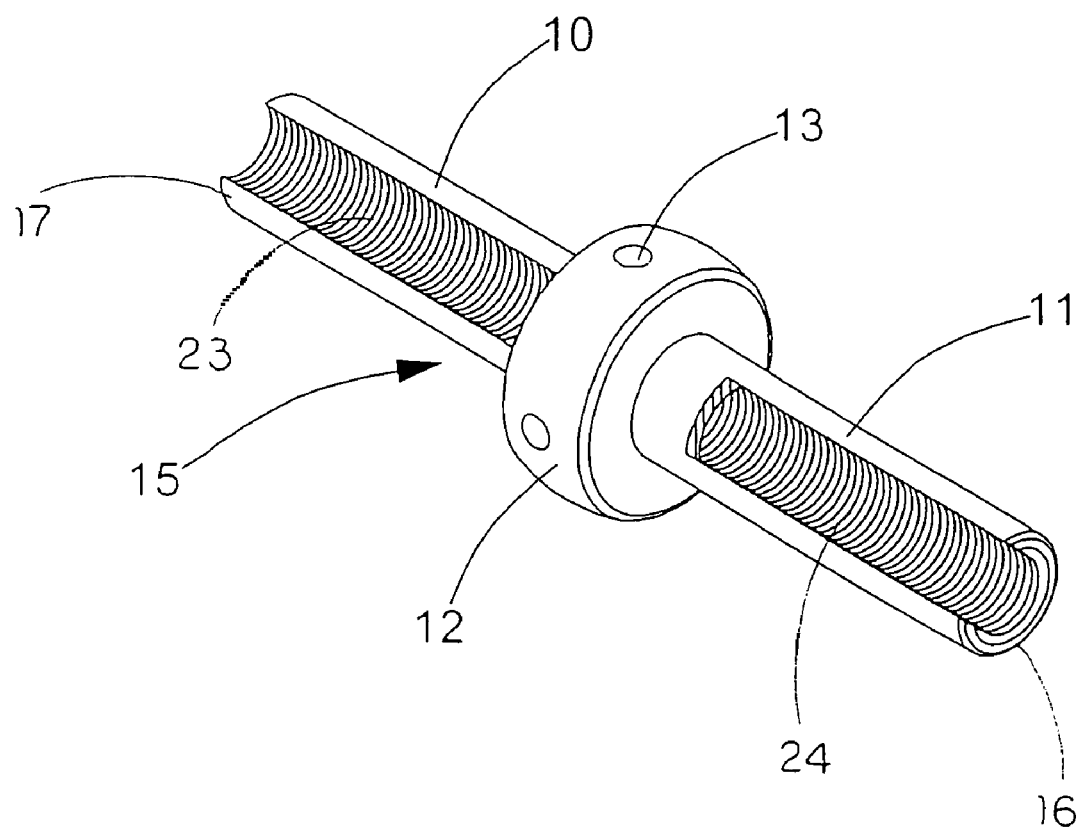
FIG. 5 is a perspective view of the control sleeves illustrating the two inner thread portions.

According to the preferred embodiment of the present invention as shown in FIG. 1, 8 of the drawings, a car seat head rest for mounting on a car seat having two spaced apart retention slots 2 comprises a head pillow 5 having a rear side, a bottom side, and an interior cavity. The car seat head rest further comprises an adjustable mounting arrangement having a length-adjustable sliding guider 3 longitudinally supported within the interior cavity of the head pillow 5 as shown in FIGS. 3 and 4 of the drawings and two supporting arms 31, 32 downwardly and parallels extended from the sliding guider 3 respectively through the bottom side of the head pillow 5 to define an engaging distance between the two supporting arms 31, 32. The two supporting arms 31, 32 are usually made of stainless steel so that they are strong; highly corrosion resisted, and can withstand any shocks and vibration from the moving vehicles when they are mounted on the car seat through the retention slots 2.

Figure 2:
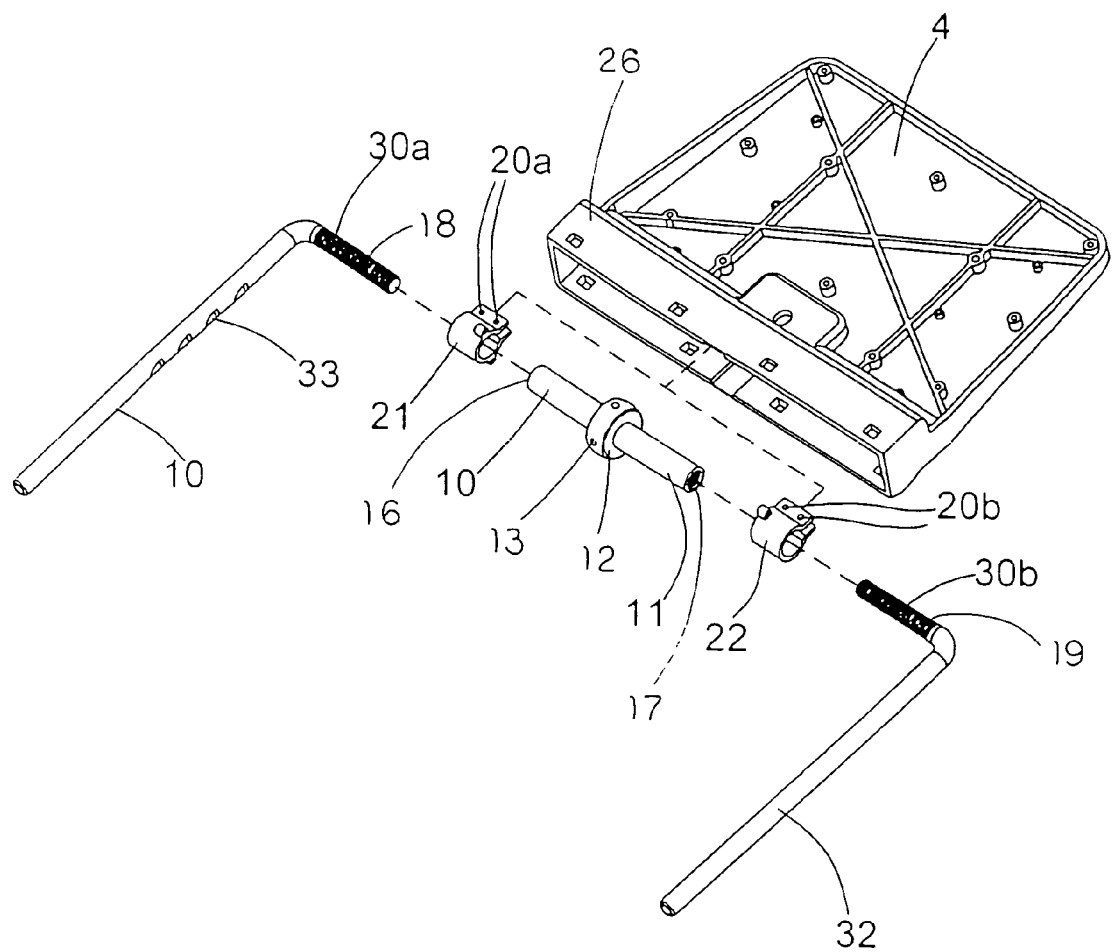
FIG. 2 is an exploded perspective view of the car seat head rest according to the preferred embodiment of the present invention.

According to FIG. 2 of the drawings, the car seat head rest further comprises an adjuster 12 provided at the sliding guider 3 to control a length of the sliding guider 3 so as to selectively adjust the engaging distance of the supporting arms 31, 32. When the engaging distance of the supporting arms 31, 32 is adjusted corresponding to a distance between the two retention slots 2 of the car seat, the two supporting arms 31, 32 are adapted for slidably engaging with the two retention slots 2 of the car seat respectively so as to securely support the head pillow 5 on the car seat. The supporting arms 31, 32 further has a plurality of slot 33 installed along thereon to couple with the two retention slots 2 such that the height of the car seat head rest can be adjusted.

The car seat head rest further comprises a display screen 34 built-in at the rear side of the head pillow 5. The adjustable mounting arrangement further comprises a supporting frame 4 upwardly extended from the sliding guider 3 within the interior cavity of the head pillow 5 to support the display screen 34 at the rear side of the head pillow 5 so as to substantially retain the display screen 34 in position. The display screen 34 provides entertainment to the passengers behind the car seat head rest such as playing a DVD movie or TV.

The two supporting arms 31, 32 are two hollow arms respectively that a communication cable of the display screen 34 is extended through one of the supporting arms 31, 32 so as to protectively conceal the communication cable within the respective supporting arm 31, 32. Therefore, the communication cable can provide signals and power required for the display screen 34 and is hidden inside the two supporting arms 31, 32 so as to keep an aesthetic appearance.

According to FIG. 2-5 of the drawings, the adjuster 12 further comprises a control sleeve 10, 11 having two side opening ends 16, 17. The sliding guider 3 comprises two sliding shafts 18, 19 engaging with the control sleeve 10, 11 at a position that inner ends of the sliding shafts 18, 19 are coaxially and slidably engaging with the side opening ends 16, 17 of the control sleeve respectively. While outer ends of the sliding shafts 18, 19 are securely attached to the supporting arms 31, 32 in such a manner that when the inner ends of the two sliding shafts 18, 19 are coaxially slid within side opening ends 16, 17 of the control sleeve 10, 11 respectively in a synchronized manner, the supporting arms 31, 32 are correspondingly moved to control the engaging distance between the two supporting arms 31, 32.

The control sleeve 10, 11 has two inner thread portions 23, 24 provided at the two opening ends 16, 17 respectively. Each of the sliding shafts 18, 19 has an outer threaded 30a, 30b portion slidably engaging with the corresponding inner thread portion 23, 24 of the control sleeve 10, 11. When the control sleeve 10, 11 is driven to rotate, the sliding shafts 18, 19 are slid correspondingly to control the engaging distance between the two supporting arms 31, 32.

The two inner thread portions 23, 24 of the control sleeve 10, 11 are extended in opposite spiral direction such that when the control sleeve 10, 11 is rotated at a clockwise direction, the sliding shafts 18, 19 are synchronically slid towards each other to minimize the engaging distance between the two supporting arms 31, 32. When the control sleeve 10, 11 is rotated at a counter clockwise direction, the sliding shafts 18, 19 are synchronically slid away from each other to maximize the engaging distance between the two supporting arms 31, 32.

The adjuster 12 further comprises a manual tuner 13, which is coaxially mounted to the control sleeve 10, 11, having a manipulating portion extending out of the interior cavity of the head pillow 5 through the bottom side thereof to drive the control sleeve 10, 11 to rotate. A manipulating tool is used to rotate the manual tuner 13 to turn the adjuster 12 such that the control sleeve 10, 11 can be rotated in the clockwise or counter clockwise depending on which way the adjuster is rotated so as to adjust the engaging distance between the two supporting arms 31, 32. FIG. 3 displays the rotation of the adjuster 12 to minimize the engaging distance between the two supporting arms 31, 32. FIG. 4 displays the rotation of the adjuster 12 to maximize the engaging distance between the two supporting arms 31, 32.

The supporting frame 4 comprises a supporting panel supported within the interior cavity of the head pillow 5 to rigidly support the display screen 34 and a base housing 26 pivotally coupling with the sliding guider 3 in such a manner that the head pillow 5 is pivotally moved for adjusting a head-supporting angle of the head pillow 5 with respect to the car seat when the supporting arms 31, 32 are slidably inserted into the retention slots 2 of the car seat respectively.

Figure 6:
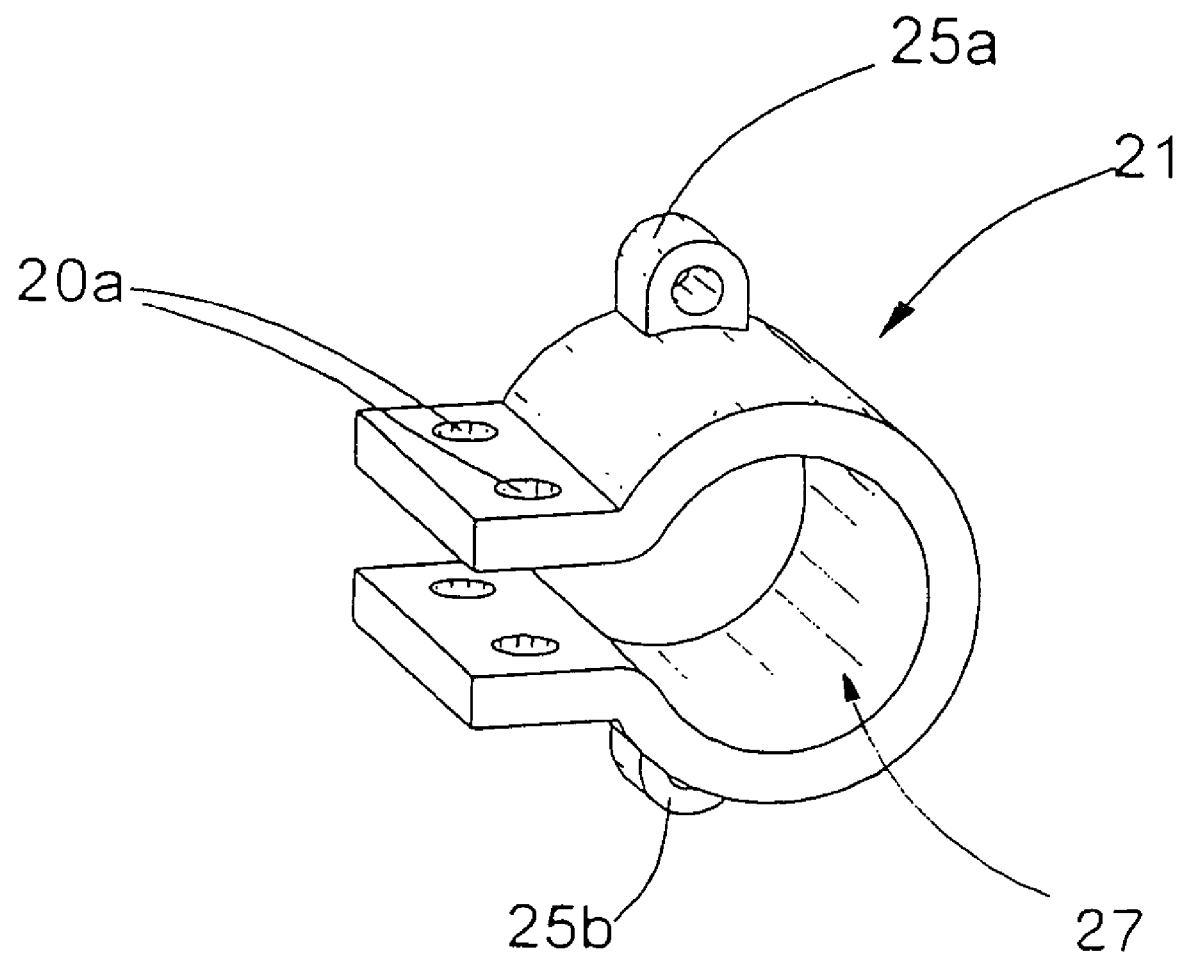
FIG. 6 is a perspective view of the U-shaped reinforcing brackets.
Figure 7:
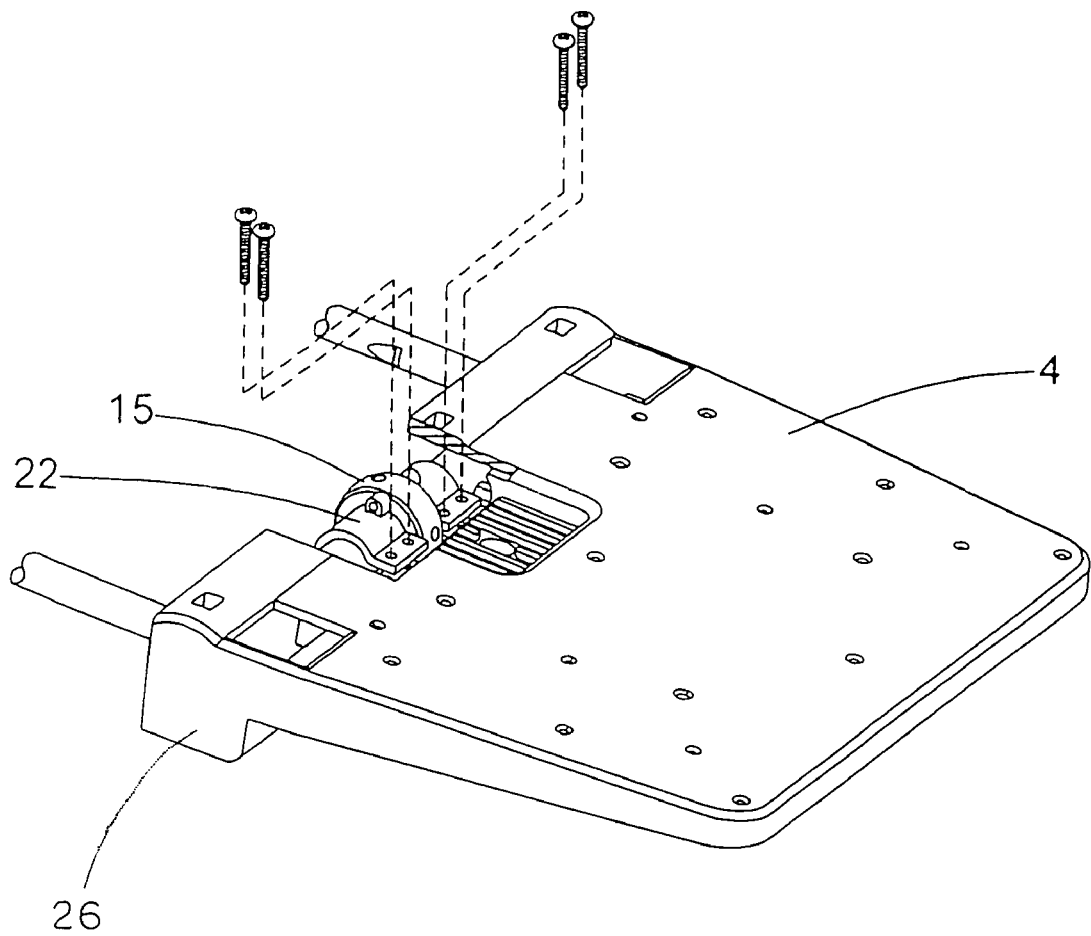
FIG. 7 is a perspective view illustrating the supporting frame and the base housing illustrating the mounting arrangement of the reinforcing brackets.
Figure 8:
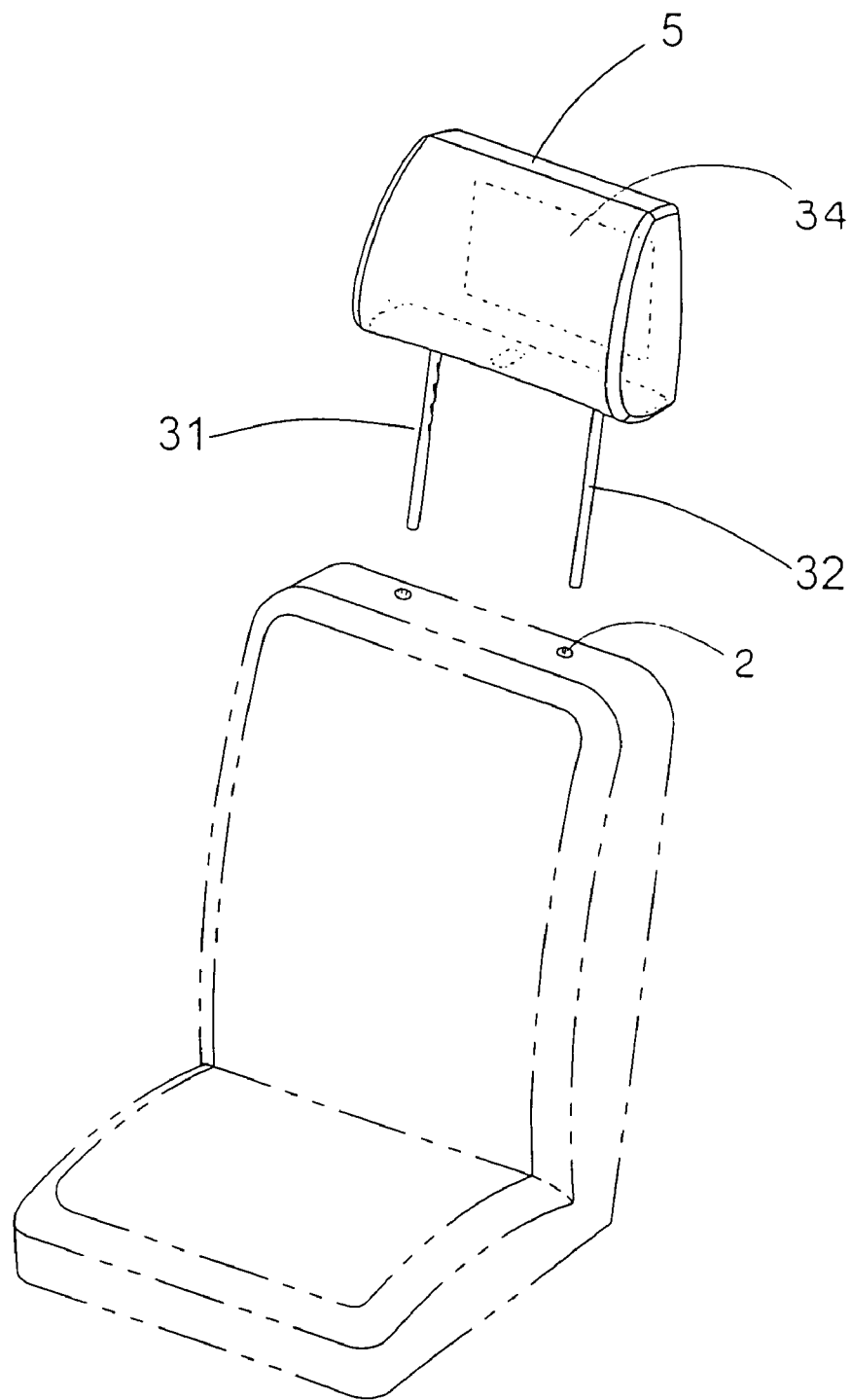
FIG. 8 is a perspective view of the car seat head rest illustrating the mounting arrangement onto the car seat.

According to FIGS. 2 and 6 of the drawings of the preferred embodiment, the base housing 26 further comprises two U-shaped reinforcing brackets 21, 22. Each of the U-shaped reinforcing brackets 21, 22 has a reinforcing slot 27, mounted at two sidewalls of head pillow 5 respectively at a position that the two supporting arms 31, 32 are extended from the sliding guider 3 through the reinforcing slots 27 of the reinforcing brackets 21, 22 respectively. The reinforcing brackets 21, 22 not only reinforce the head pillow 5 but also limit the head-supporting angle of the head pillow 5 by a width of each of the reinforcing slots 27. The reinforcing brackets 21, 22 are firmly mounted onto the base housing 26 through a plurality of reinforcing hole 20a, 20b, 25a, 25b by use of simple bolts and screws.

The car seat head set comprising a bottom enclosing cover 28 mounted at the bottom side of the head pillow 5 to enclose the interior cavity thereof. The enclosing cover 28 has a tuner opening 29 for the manipulating portion of the manual tuner 13 protruding therefrom such that the manual tuner 13 can be easily rotated by the user. The enclosing cover 28 further has two elongated arm openings 35, 36 for the supporting arms 31, 32 extending out of the bottom side of the head pillow 5 through the arm openings 35, 36 respectively. The enclosing cover 28 provides a better protection for the display screen 34 and the adjustable mounting arrangement against dirt and impact.

Figure 9:
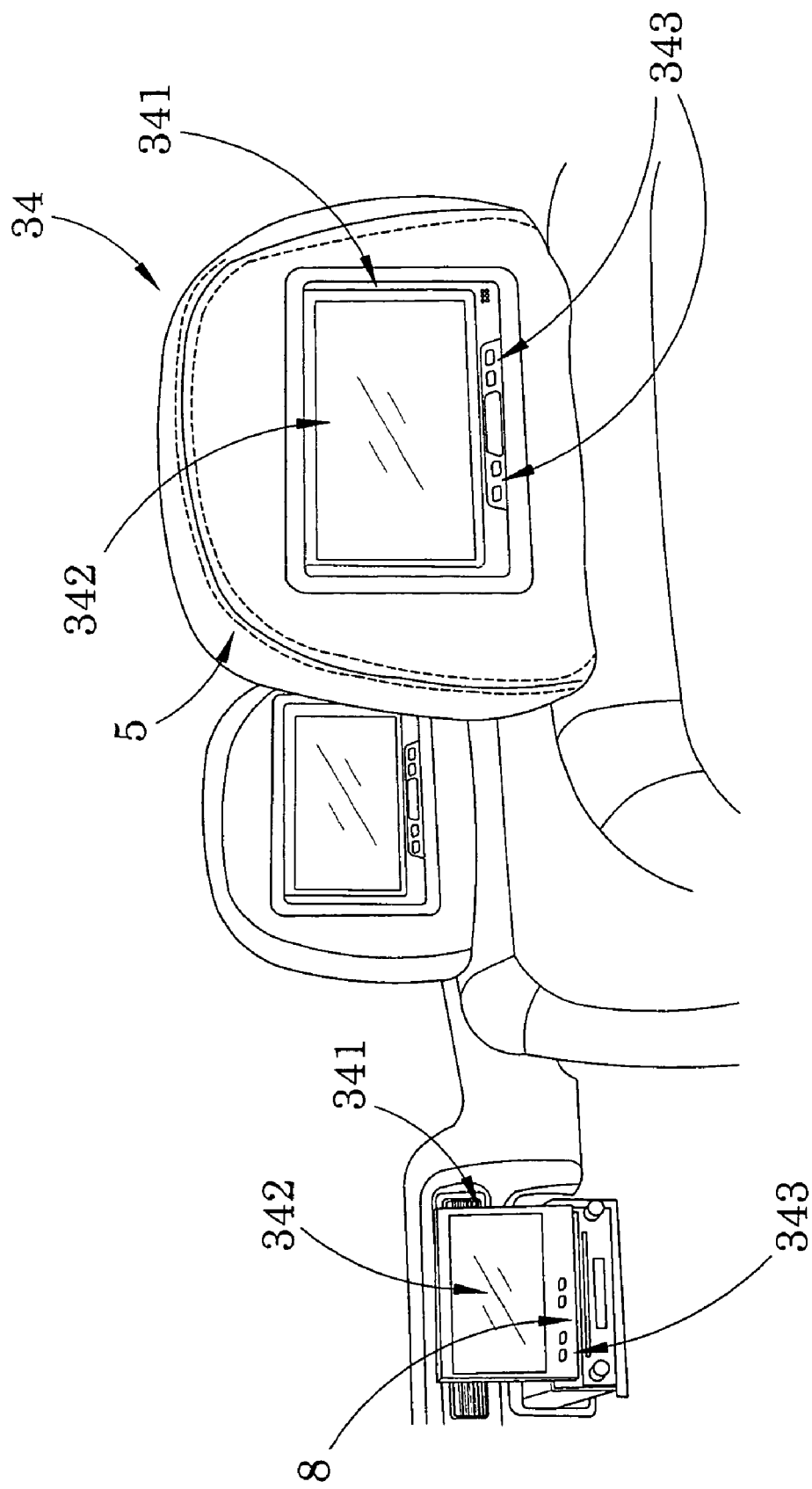
FIG. 9 is a perspective view of the car seat head rest according to the first preferred embodiment of the present invention.

As shown in FIG. 9, the present invention also provides a vehicle multimedia system for a vehicle, wherein the vehicle multimedia system comprises a car seat head rest, a display screen 34, and a central control.

The car seat head rest, which is mentioned above, comprises a head pillow 5 having a rear side, a bottom side and an interior cavity, and two tubular supporting arms 31, 32, downwardly extended from the bottom of the head pillow 5 for slidably engaging with two retention slots 2 of the car seat so as to support the head pillow 5 above the car seat.

The display screen 34 is supported at the rear side of the head pillow 5 such that the passenger sitting at the back seat of the vehicle is able to view the info displayed on the display screen 34.

Figure 11:
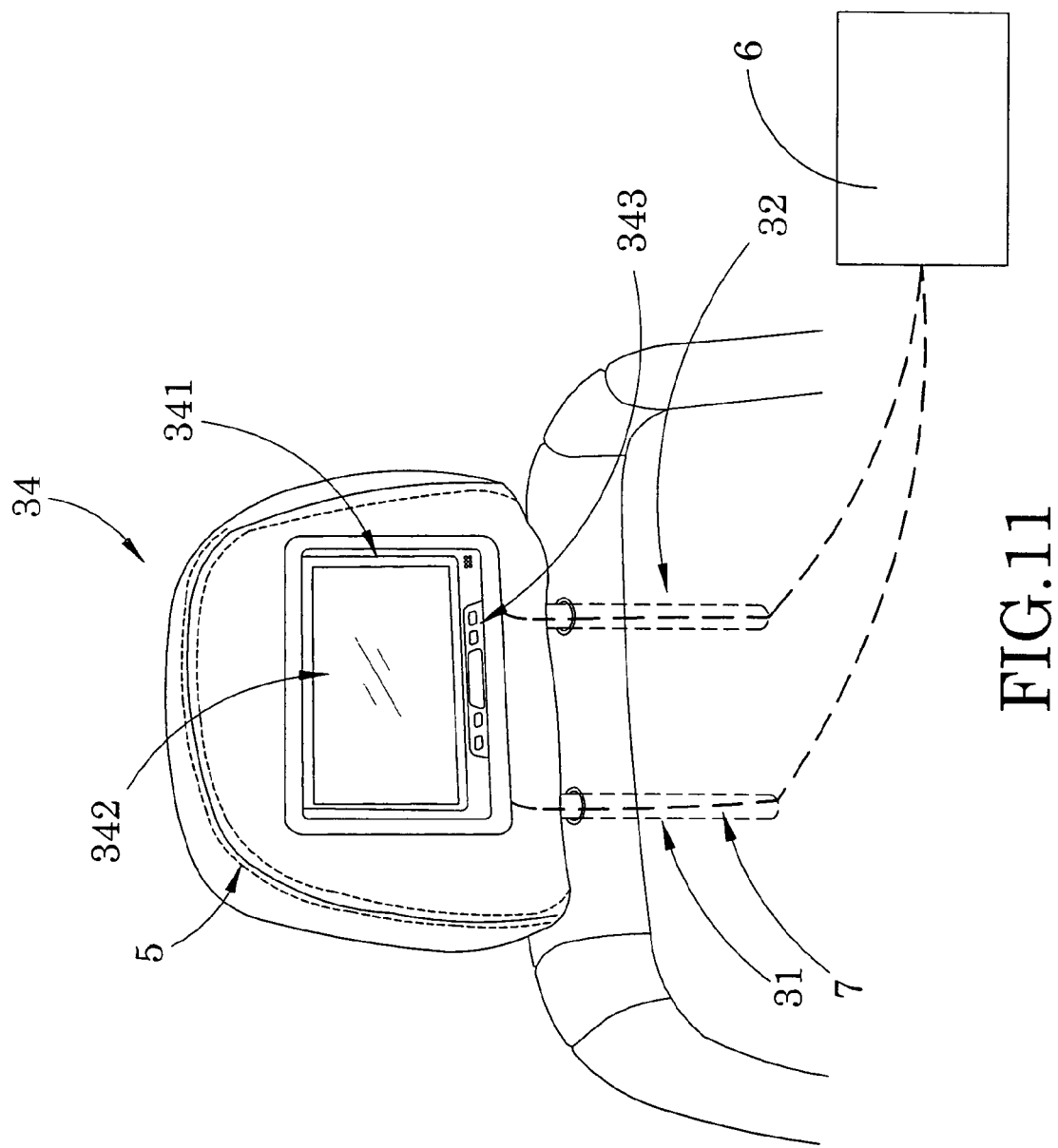
FIG. 11 illustrates the connection cable extended between the display screen and the central control in a hidden manner according to the first preferred embodiment of the present invention.

The central control 6, which is adapted for being installed at a predetermined location of the vehicle, is electrically linked to the display screen 34 via a connection cable 7 running through one of the supporting arms 31, 32. Accordingly, the connection cable 7 is extended between the display screen 34 and the central control 6 in a hidden manner, as shown in FIG. 11, wherein the central control 6 selectively generates a signal and transmits the signal to the display screen 34 through the connection cable 7, so as to display on the display screen 34.

The display screen 34 comprises a LCD monitor 341 and a touch screen control 342 interfacing with the LCD monitor 341 to controllably operate the central control 6 in such a manner that the display screen 34 provides not only a display interface for displaying signal from the central control 6 but also a control interface for operating the central control 6 to selectively output the signal therefrom.

The display screen 34 is built-in at the rear side of the head pillow 5 and the central control 6 is installed into a dashboard of the vehicle, such that the display screen 34 is adapted for a passenger controllably operating the central control 6 so as to keep a driver focusing on driving. On the other hand, the central control 6 comprise a multiple-signal output 63 communicatively linked to two or more display screens 34 supported by two or more head pillows 5 respectively, wherein the multiple-signal output 63 is selectively adjusted to a synchronizing mode that a signal is transmitted to and displayed at the display screens 34 at the same time and to a discrete mode that the display screens 34 display different signals from the central control 6.

Preferably, two display screens 34 are built-in at the rear sides of the head pillows 5 respectively and one display screen 34 is installed at the dashboard of the vehicle such that the driver is able to control the central control 6 through the display screen 34 at the dashboard while the passengers are able to control the central control 6 through the display screen 34 at the head pillows 5.

The central control 6 comprises a control processor 61 processing signal in a predetermined format to display on the display screen 34. The central control 6 further comprises a plurality of input terminals 62 communicatively linked to the control processor 61 for communicatively coupling with different peripheral electronic devices 7 so as to not only transmit signal from each of peripheral electronic devices 7 to the display screen 34 but also control the respective peripheral electronic device 7 through the display screen 34.

Accordingly, the input terminals 62 comprises a card reader adapted for reading an external memory card, such as "SD card", and a USB terminal adapted for communicatively connecting to an external USB device, wherein the external devices, such as cameras or camcorders, can communicatively link to the central control 6 such that the central control 6 not only processes a picture or video profile to the display screen 34 but also manages the image profile through the display screen 34.

Figure 10:
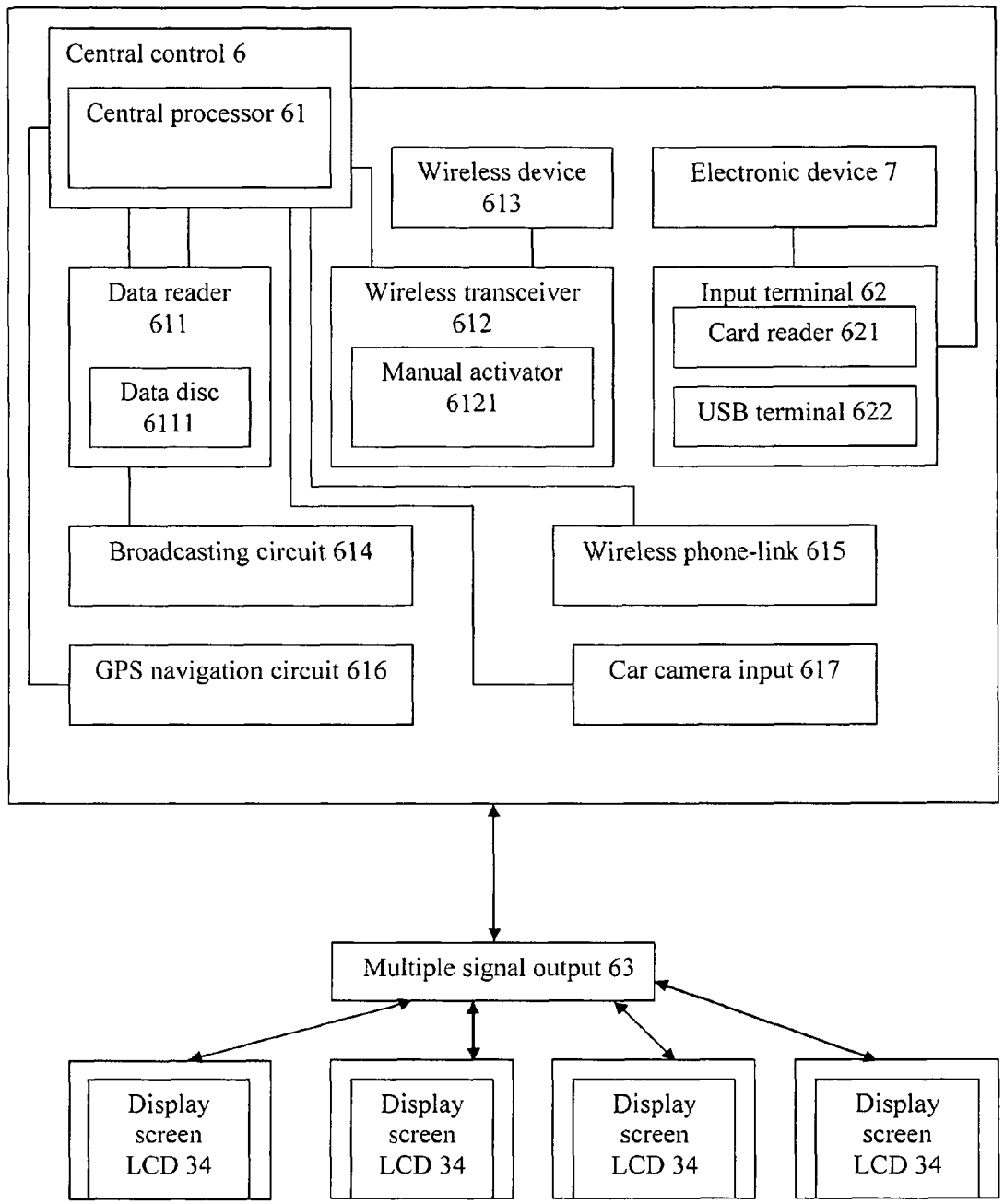
FIG. 10 is a block diagram illustrating the connection between CPU and its connecting method.

As shown in FIG. 10, the central control 6 comprises a data reader 611 communicatively linked to the control processor 61 for reading data from an external data disc 6111 so as to not only transmit signal from the external data disc 6111 to the display screen 34 but also selectively output a data from the external data disc 6111 through the display screen 34. The data disc includes the CD, DVD, and the like.

The central control 6 comprises a wireless transceiver 612 communicatively linked to the control processor 61 for wirelessly connecting with a wireless device 613 so as to not only transmit a signal from the wireless device 613 to the display screen 34 but also control the wireless device 613 through the display screen 34. The wireless connectivity of the central control 6 is selected from the group of Bluetooth connectivity, WIFI, Infrared connectivity, and Radio Frequency connectivity. When the display screen 34 has the compatible wireless connectivity, the central control 6 is capable of wireless connecting with the display screen 34. For example, if the display screen 34 has a built in Infrared connectivity connecting function, the central control 6 is adapted to pair with the display monitor 34 to transmit the audio signal from the display monitor 34 to the speaker and monitor.

The wireless link between the wireless transceiver 612 and the display screen 34 can be established automatically and manually. Preferably, it should be set up by manual for security purpose. Accordingly, the wireless transceiver 612 further comprises a manual activator 6121 electrically linked to the wireless transceiver 612 to manually activate the wireless transceiver 612 for wireless linking the display screen 34. The user is able to manually activate the wireless transceiver 612 via the manual activator 6121 to establish the wireless link between the wireless transceiver 612 and the display screen 34. For example, in order to active the wireless, the user chooses to activate the connection between the central processor 61 in the central control 6 and wireless activator by manual for linking to the Internet and the Navigation. People can surf for their interests and desires through the Internet. On the other hand, they still can set up automatically linking option. Once, the display screen 34 turns on, the wireless transceivers will automatically searching for a wireless signal for wireless link.

According to the preferred embodiment, the central control 6 forms a multimedia center for the vehicle to provide a combination of different entertainment forms including text, audio, video, picture, and interactivity content forms for all passengers in the vehicle. Accordingly, the central control 6 comprises a broadcasting circuit 614, a wireless phone link 615, a GPS navigation circuit 616, and a car camera input 617.

Accordingly, the broadcasting circuit 614 is communicatively linked to the control processor 61 for wirelessly receiving a radio broadcasting signal and television broadcasting signal so as to not only transmit a radio broadcasting signal and a television broadcasting signal to the display screen 34 but also select a channel of each of a radio broadcasting signal and a television broadcasting signal through the display screen 34.

The wireless phone link 615 is communicatively linked to the control processor 61 for wirelessly paring with a mobile phone, such that the display screen 34 is adapted for wirelessly operate the mobile phone through a wireless phone link 615.

The GPS navigation circuit 616 communicatively linked to the control processor 61 for obtaining a GPS signal so as to not only transmit a GPS signal to the display screen 34 but also operate the GPS navigation circuit 616 through the display screen 34. When the user gets lost on the way to somewhere, he or she can gain the right direction from the navigation. It is worth to mention that the passenger is able to input the destination info to the GPS navigation circuit 616 through the display screen 34 such that the driver is able to keep focusing on driving.

The car camera input 617 linked to the control processor 61 for obtaining the data image from a camera device, such as a back-up camera, once the camera device is installed at the rear side of the vehicle and is operatively linked to the car camera input 617. It is worth to mention that when the data image from the back-up camera is displayed on the corresponding display screen 34 for the driver, other display screens 34 at the car seat head rests can be operated individually for displaying desired signal from the central control 6.

Accordingly, all people, including the driver and the passengers, can control the central control 6 through the display screen 34 to selectively activate the broadcasting circuit 614, the wireless phone link 615, the GPS navigation circuit 616, and the car camera input 617. For example, the passenger, sitting at the back seat of the vehicle, is able to make a phone call through the control of the corresponding display screen 34 once the phone is paired with the wireless phone link 615.

It is worth to mention that most of the car seat heads with build-in screens sold on the market can only operate itself. In other words, though some built-in screens have a touch screen function on the screen, it is not allowable for people to control the central control 6 for example changing the music in the car. According to the preferred embodiment of the present invention, the display screen 34 provides both the synchronizing mode and the discrete mode such that the passenger is able to adjust the function to meet the entire passenger's need. For example, through the discrete mode one can play computer games and watch DVDs, others can watch TV or surf the internet. On the other hand, through the synchronizing mode, the entire passenger can enjoy the same function such as browsing the navigation, doing the office work. The most important thing of all is that the central control 6 of the display screen 34 is usually controlled by anyone in the car. When the driver tries to adjust the function on the monitor, other people can give the driver a help. According to the embodiment of the present invention, the central control 6 can be controlled by any passenger in the car. Moreover, the passenger can control the whole setting of the central control 6 following by the drivers desire. Thus, the embodiment makes the driver focus on driving such that safety of driving is greatly improved.

The steps to operate the touch screen on the display screen follow the following steps: at first, the user can choose the function from the function list. For example, on the function list page, there is DVD, CD, TV, FM/AM radio, navigation, and the internet. The user can pick the DVD via touching the screen DVD option. Second, on the song list page, there is a list of different song. In the same manner, the user is able to pick the song they preferred to listen through touching the screen song option. It is worth to mention that, compared to other music player, the steps of controlling the touch screen monitor makes operating the music becomes very easy. People do not need to know the function of every button on the music player. One only need to do is to follow what they see on the touch screen monitor and choose what they prefer.

On the other hand, the user can also choose their option via the remote control 7. Via using the remote control 7, the user can further control the display screen 34 more easily and make us feel comfortable. One doesn't need to alternate their posture to control the display screen while wearing a seat belt in a car. On the other hand, a remote control 7 usually includes a fully equipped function key. If someone needs to look for some specific function on the touch screen, it is not easy to find and show all of the function on the screen. The remote control 7 helps people to solve this problem especially for some specific setting mode. Thus, the user not only takes the benefit of feeling more ease to control the display screen 34, but also makes good use of all the function of the display screen 34.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A vehicle multimedia system for a vehicle having a car seat, comprising:

a car seat head rest, which is adapted for installing into any size of car seat having two retention slots, which comprises a head pillow having a rear side, a bottom side and an interior cavity, and two tubular supporting arms downwardly extended from said bottom side of said head pillow, wherein said car seat head rest further comprises an adjustable mounting arrangement which comprises a length-adjustable sliding guider longitudinally supported within said interior cavity of said head pillow, and an adjuster provided at said sliding guider to control a length of said sliding guider, wherein said two supporting arms are downwardly and parallelly extended from said sliding guider to define an engaging distance between said two supporting arms, wherein said supporting arms are adjustable with said engaging distance therebetween via said adjuster for matching with said two retention slots of said car seat, wherein when said adjuster is rotated at one direction, said supporting arms are synchronically moved to increase said engaging distance, and when said adjuster is rotated at an opposed direction, said supporting arms are synchronically moved to reduce said engaging distance, such that said supporting arms of said car seat head rest are adjusted for slidably engaging with said two retention slots of said car seat so as to support said head pillow above said car seat;

a display screen supported and built in at said rear side of said head pillow to form a car seat head rest with built-in screen for allowing said car seat head rest being installed in any size of car seat; and a central control, which is adapted for being installed at a predetermined location of said vehicle, electrically linked to said display screen via a connection cable running through one of said supporting arms such that said connection cable is extended between said display screen and said central control in a hidden manner, wherein said central control selectively generates a signal and transmits said signal to said display screen through said connection cable, so as to display on said display screen, wherein said central control is also controlled by said display screen in order to operate said central control at said rear side of said head pillow of said car sear head rest.

2. The vehicle multimedia system, as recited in claim 1, wherein said display screen comprises a LCD monitor and a touch screen control interfacing with said LCD monitor to controllably operate said central control in such a manner that said display screen provides not only a display interface for displaying said signal from said central control but also a control interface for operating said central control to selectively output said signal therefrom.

3. The vehicle multimedia system, as recited in claim 2, wherein said central control comprises a control processor processing said signal in a predetermined format to display on said display screen.

4. The vehicle multimedia system, as recited in claim 3, wherein said central control comprises a plurality of input terminals communicatively linked to said control processor for communicatively coupling with different peripheral electronic devices so as to not only transmit said signal from each of said peripheral electronic devices to said display screen but also control said respective peripheral electronic device through said display screen.

5. The vehicle multimedia system, as recited in claim 4, wherein said central control comprises a data reader communicatively linked to said control processor for reading data from an external data disc so as to not only transmit signal from said external data disc to said display screen but also selectively output said data from said external data disc through said display screen.

6. The vehicle multimedia system, as recited in claim 5, wherein said central control comprises a wireless transceiver communicatively linked to said control processor for wirelessly connecting with a wireless device so as to not only transmit said signal from said wireless device to said display screen but also control said wireless device through said display screen.

7. The vehicle multimedia system, as recited in claim 6, wherein said central control comprises a broadcasting circuit communicatively linked to said control processor for wirelessly receiving a radio broadcasting signal and television broadcasting signal so as to not only transmit said radio broadcasting signal and said television broadcasting signal to said display screen but also select a channel of each of said radio broadcasting signal and said television broadcasting signal through said display screen.

8. The vehicle multimedia system, as recited in claim 7, wherein said central control comprises a wireless phone link communicatively linked to said control processor for wirelessly paring with a mobile phone, such that said display screen is adapted for wirelessly operate said mobile phone through said wireless phone link.

9. The vehicle multimedia system, as recited in claim 8, wherein said central control comprises a GPS navigation circuit communicatively linked to said control processor for obtaining a GPS signal so as to not only transmit said GPS signal to said display screen but also operate said GPS navigation circuit through said display screen.

10. The vehicle multimedia system, as recited in claim 9, wherein said display screen is built-in at said rear side of said head pillow and said central control is installed into a dashboard of said vehicle, such that said display screen is adapted for a passenger controllably operating said central control so as to keep a driver focusing on driving.

11. The vehicle multimedia system, as recited in claim 10, wherein said central control comprise a multiple-signal output communicatively linked to two or more said display screens supported by two or more said head pillows respectively, wherein said multiple-signal output is selectively adjusted to a synchronizing mode that said signal is transmitted to and displayed at said display screens at the same time and to a discrete mode that said display screens display different signals from said central control.

12. The vehicle multimedia system, as recited in claim 3, wherein said central control comprises a data reader communicatively linked to said control processor for reading data from an external data disc so as to not only transmit signal from said external data disc to said display screen but also selectively output said data from said external data disc through said display screen.

13. The vehicle multimedia system, as recited in claim 3, wherein said central control comprises a wireless transceiver communicatively linked to said control processor for wirelessly connecting with a wireless device so as to not only transmit said signal from said wireless device to said display screen but also control said wireless device through said display screen.

14. The vehicle multimedia system, as recited in claim 3, wherein said central control comprises a broadcasting circuit communicatively linked to said control processor for wirelessly receiving a radio broadcasting signal and television broadcasting signal so as to not only transmit said radio broadcasting signal and said television broadcasting signal to said display screen but also select a channel of each of said radio broadcasting signal and said television broadcasting signal through said display screen.

15. The vehicle multimedia system, as recited in claim 3, wherein said central control comprises a wireless phone link communicatively linked to said control processor for wirelessly paring with a mobile phone, such that said display screen is adapted for wirelessly operate said mobile phone through said wireless phone link.

16. The vehicle multimedia system, as recited in claim 3, wherein said central control comprises a GPS navigation circuit communicatively linked to said control processor for obtaining a GPS signal so as to not only transmit said GPS signal to said display screen but also operate said GPS navigation circuit through said display screen.

17. The vehicle multimedia system, as recited in claim 3, wherein said display screen is built-in at said rear side of said head pillow and said central control is installed into a dashboard of said vehicle, such that said display screen is adapted for a passenger controllably operating said central control so as to keep a driver focusing on driving.

18. The vehicle multimedia system, as recited in claim 3, wherein said central control comprise a multiple-signal output communicatively linked to two or more said display screens supported by two or more said head pillows respectively, wherein said multiple-signal output is selectively adjusted to a synchronizing mode that said signal is transmitted to and displayed at said display screens at the same time and to a discrete mode that said display screens display different signals from said central control.

19. The vehicle multimedia system, as recited in claim 1, wherein said central control comprises a control processor processing said signal in a predetermined format to display on said display screen.

20. The vehicle multimedia system, as recited in claim 1, wherein said central control comprise a multiple-signal output communicatively linked to two or more said display screens supported by two or more said head pillows respectively, wherein said multiple-signal output is selectively adjusted to a synchronizing mode that said signal is transmitted to and displayed at said display screens at the same time and to a discrete mode that said display screens display different signals from said central control.

* * * * *